(12) United States Patent
Buhmann et al.

(10) Patent No.: US 7,866,143 B2
(45) Date of Patent: Jan. 11, 2011

(54) EXHAUST GAS TREATMENT SYSTEM

(75) Inventors: Rudolf Buhmann, Esslingen (DE);
Rainer Lehnen, Stuttgart (DE); Arthur Wieland, Aichtal (DE)

(73) Assignee: J. Eberspaecher GmbH & Co. KG, Esslingen (DE)

( * ) Notice: Subject to any disclaimer, the term of this patent is extended or adjusted under 35 U.S.C. 154(b) by 1297 days.

(21) Appl. No.: 11/331,696

(22) Filed: Jan. 13, 2006

(65) Prior Publication Data
US 2006/0156712 A1 Jul. 20, 2006

(30) Foreign Application Priority Data
Jan. 17, 2005 (DE) .............. 10 2005 002 289

(51) Int. Cl.
*F01N 3/00* (2006.01)
(52) U.S. Cl. .............. 60/286; 60/295; 60/301; 422/171; 422/182
(58) Field of Classification Search ............... 60/286, 60/295, 297, 301; 422/171, 172, 177, 182
See application file for complete search history.

(56) References Cited

U.S. PATENT DOCUMENTS

| | | | |
|---|---|---|---|
| 6,718,757 B2 * | 4/2004 | Khair et al. | 60/286 |
| 6,941,748 B2 * | 9/2005 | Pott et al. | 60/295 |
| 6,996,975 B2 * | 2/2006 | Radhamohan et al. | 60/286 |
| 2003/0108457 A1 | 6/2003 | Gault et al. | |
| 2003/0221424 A1 | 12/2003 | Woerner et al. | |

FOREIGN PATENT DOCUMENTS

| | | |
|---|---|---|
| EP | 1050670 | 8/2000 |
| GB | 2381218 | 4/2003 |
| WO | WO 03/072915 | 4/2003 |
| WO | WO 2004022935 A1 * | 3/2004 |

* cited by examiner

*Primary Examiner*—Tu M Nguyen
(74) *Attorney, Agent, or Firm*—Howard IP Law Group, PC

(57) ABSTRACT

An exhaust gas treatment system for an exhaust system of an internal combustion engine includes a basic housing and an add-on housing mounted thereon so it is at least partially detachable. The basic housing contains at least one inlet pipe which can be connected to the exhaust system and leads into the basic housing, at least one outlet pipe which can be connected to the exhaust system and leads out of the basic housing, at least one SCR catalyst and at least one oxidizing catalytic converter. The add-on housing contains at least one particle separation device and at least one reducing agent feed mechanism.

18 Claims, 7 Drawing Sheets

EXHAUST GAS TREATMENT SYSTEM

FIELD OF THE INVENTION

The present invention relates to an exhaust gas treatment system for an exhaust system of an internal combustion engine, in particular in a motor vehicle.

BACKGROUND OF THE INVENTION

It is known that to be able to comply with the ever more stringent exhaust standards for internal combustion engines, in particular for diesel engines, the respective exhaust system may be equipped with an oxidizing catalytic converter, a particulate filter and an SCR catalyst, where SCR stands for "selective catalytic reaction." Upstream from this SCR catalyst, a suitable reducing agent, preferably urea, is sprayed into the exhaust stream. Then with the help of the reducing agent, effective degradation of nitrogen oxides is performed in the SCR catalyst. Such exhaust systems are comparatively complex due to the plurality of components and also take up a great deal of space. Therefore, there has been a search for the most compact possible means of achieving this object. In addition, during operation of the exhaust system, residues that cannot be incinerated in the respective particulate filter are deposited, causing progressive clogging of the flow cross section of the particulate filter. Accordingly, maintenance must be performed occasionally, at which time the particulate filter is cleaned or replaced with a new one. As part of conventional maintenance on an internal combustion engine or a vehicle equipped with same, it is desirable to minimize the required assembly complexity.

SUMMARY OF THE INVENTION

The present invention relates to the problem of providing means that will permit a compact design in particular and at the same time simple maintenance of the respective particulate separation device, e.g., a particulate filter, for an exhaust system of an internal combustion engine.

The present invention is based on the general idea of creating an exhaust gas treatment system comprised of two housings, namely a basic housing and an add-on housing which accommodate at least one inlet pipe, at least one outlet pipe, at least one SCR catalyst, at least one oxidizing catalyst, at least one particle separation device and at least one reducing agent feed device. The exhaust gas treatment system therefore has an extremely compact design. The inventive exhaust gas treatment system can be completely preassembled and can be installed in the exhaust system as a completely preassembled unit. This greatly reduces the complexity and expense in manufacturing the exhaust system. Due to the targeted arrangement of the at least one particle separation device in the add-on housing and due to the connection of the add-on housing to the basic housing such that the add-on housing can be detached at least partially from the basic housing, this also creates the possibility of performing maintenance on the particle separation device with a low cost and complexity because the add-on housing or at least a housing part of this add-on housing containing the particle separation device can be removed from the basic housing without having to remove the complete exhaust gas treatment system from the exhaust system.

The exhaust gas treatment system according to this invention thus simplifies the manufacture of the exhaust system and at the same time facilitates maintenance on the particle separation device.

Other important features and advantages of this invention are derived from the subclaims, the drawings and the respective description of the figures on the basis of the drawings.

It is self-evident that the features mentioned above and those to be explained below can be used not only in the particular combination given but also in other combinations or alone without going beyond the scope of the present invention.

BRIEF DESCRIPTION OF THE DRAWINGS

Preferred exemplary embodiments of the present invention are illustrated in the drawings an explained in greater detail in the following description, where the same reference numerals are used to refer to the same or similar or functionally identical parts.

The drawings show, each in schematic diagrams.

DETAILED DESCRIPTION OF THE INVENTION

Figure 1:
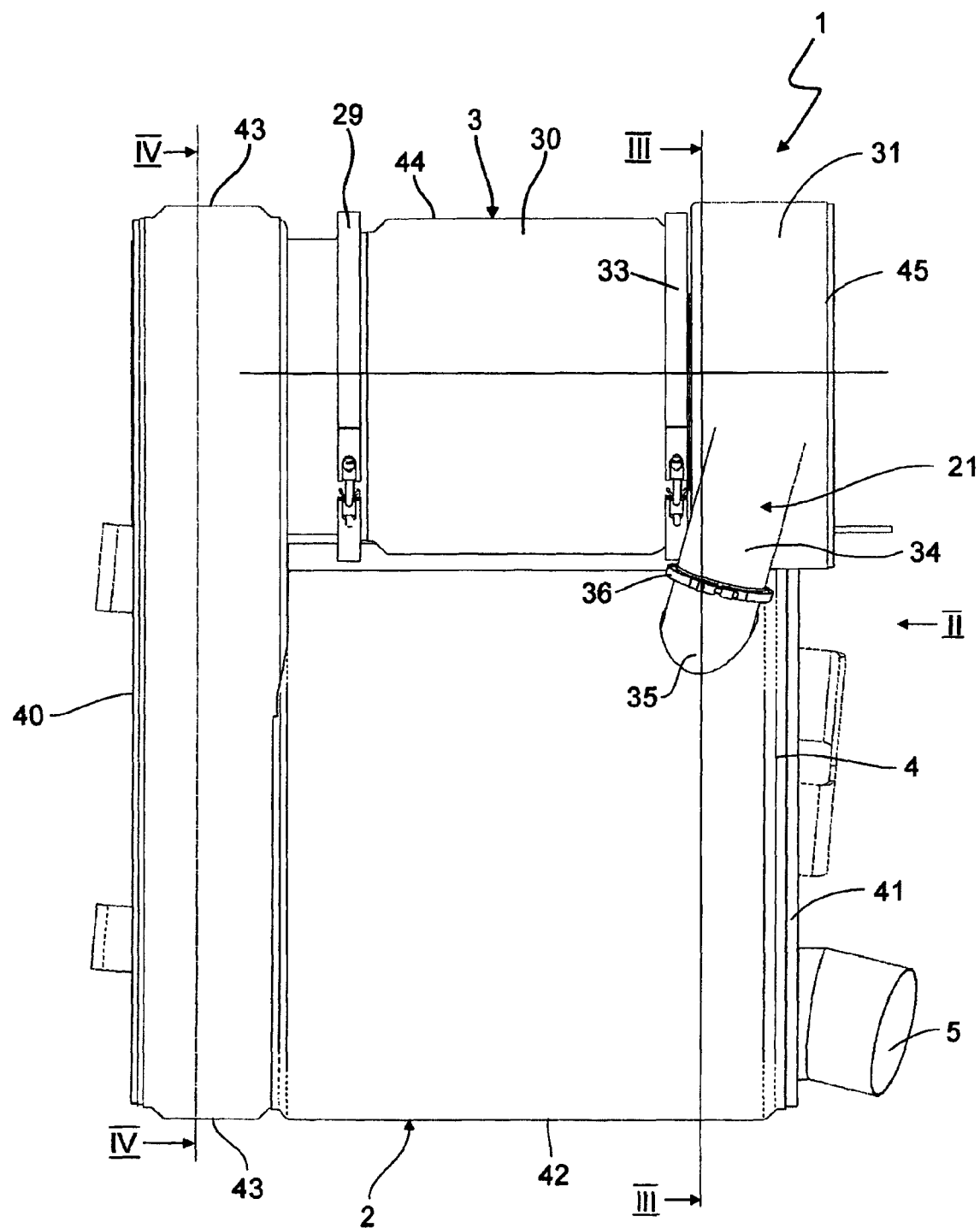
FIG. 1 is a side view of an inventive exhaust gas treatment system.

According to FIG. 1, an inventive exhaust gas treatment system 1 has a basic housing 2 and an add-on housing 3. The exhaust gas treatment system 1 is connectable to an exhaust system (not shown here) of an internal combustion engine, whereby the internal combustion engine, in particular a diesel engine, is preferably situated in a motor vehicle, preferably a commercial vehicle.

According to FIGS. 1 through 6, the exhaust gas treatment system 1 comprises in its housings 2 and 3 at least one inlet pipe 4 and at least one outlet pipe 5. Inlet pipe 4 and outlet pipe 5 are connectable to the exhaust system. The inlet pipe 4 leads into the basic housing 2 and the outlet pipe 5 leads out of the basic housing 2. In addition, at least one SCR catalyst 6 and at least one oxidizing catalytic converter 7 are arranged in the basic housing 2. In the present case several SCR catalysts 6, namely four SCR catalysts 6 are provided, with the flow passing through them in parallel. According to FIG. 6, the individual SCR catalysts may each have a plurality of individual SCR catalyst elements 8 (two in this case) which are arranged in series with regard to the flow through them. It is clear that in alternative embodiments, SCR catalysts having only a single SCR catalyst element 8 may also be used. Likewise, a single SCR catalyst 6 is sufficient in one variant of the exhaust gas treatment system 1.

Although the components of the exhaust gas treatment system 1 mentioned above, i.e., the inlet pipe 4, outlet pipe 5, SCR catalysts 6 and oxidizing catalytic converter 7 are accommodated in basic housing 2, the add-on housing 3 contains as additional components at least one particle separation device 9 and a reducing agent feed device 10. The particle separation device 9 serves to separate particles entrained in the gas flow. These are primarily particles of soot, in particular when the internal combustion engine is a diesel engine. Such particle separation devices 9 exist in various embodiments. Known examples include particulate filters 11 in which the exhaust stream is carried through a filter medium that is essentially impermeable for the entrained particles. Such a particulate filter 11 usually has a plurality of parallel channels which are alternately sealed on the incoming flow and outgoing flow ends so the exhaust flow is forced to flow from the inlet channels through the walls into the outlet channels. Such particulate filters 11 are usually made of a ceramic or sintered metal.

Other particle separation devices 9 include, for example, particle separators 12 which have an open structure. Particulate filters 11 and particle separators 12 may optionally be installed.

It is clear here that the particle separation device 9 may also be provided with a catalytically active coating, depending on the type, to support the oxidizing catalytic converter 7.

The reducing agent feed device 10 is designed here in the form of a nozzle through which the respective reducing agent, preferably urea, can be sprayed into the exhaust stream.

The exhaust gas treatment system 1 also contains multiple chambers which are needed on the one hand for flow guidance and are used on the other hand for noise suppression. To this extent, the exhaust gas treatment system 1 also includes effective sound suppression.

A first chamber 13 is arranged in the basic housing 2 between the inlet pipe 4 and the oxidizing catalytic converter 7. A second chamber 14 is arranged in the add-on housing 3 between the oxidizing catalytic converter 7 and the particle separation device 9. A third chamber 15 is arranged in the add-on housing 3 between the particle separation device 9 and a fourth chamber 16 arranged in the basic housing 2. The fourth chamber 16 is thus between the third chamber 15 and the SCR catalysts 6. A fifth chamber 17 is arranged in the basic housing 2 between the SCR catalysts 6 and the outlet pipe 5. In addition, a sixth chamber 18 is provided, also being arranged in the basic housing 2, and being positioned between the fourth chamber 16 and the fifth chamber 17. In addition, an absorption chamber 19 is also provided, said absorption chamber being situated in the basic housing 2 within the sixth chamber 18 and coaxially enclosing a longitudinal section 20 of the outlet pipe 5, indicated by a curly bracket.

A flow path represented by a plurality of arrows is formed in the exhaust gas treatment system 1. This flow path begins in the inlet pipe 4, leads from the inlet pipe 4 into the first chamber 13, passes through the oxidizing catalytic converter 7 into the second chamber 14, goes through the particle separation device 9 into the third chamber 15, passes through the connecting pipes 21 into the fourth chamber 16, then passes through the SCR catalysts 6 into the fifth chamber 17. The flow path ends at the outlet pipe 5.

Figure 2:
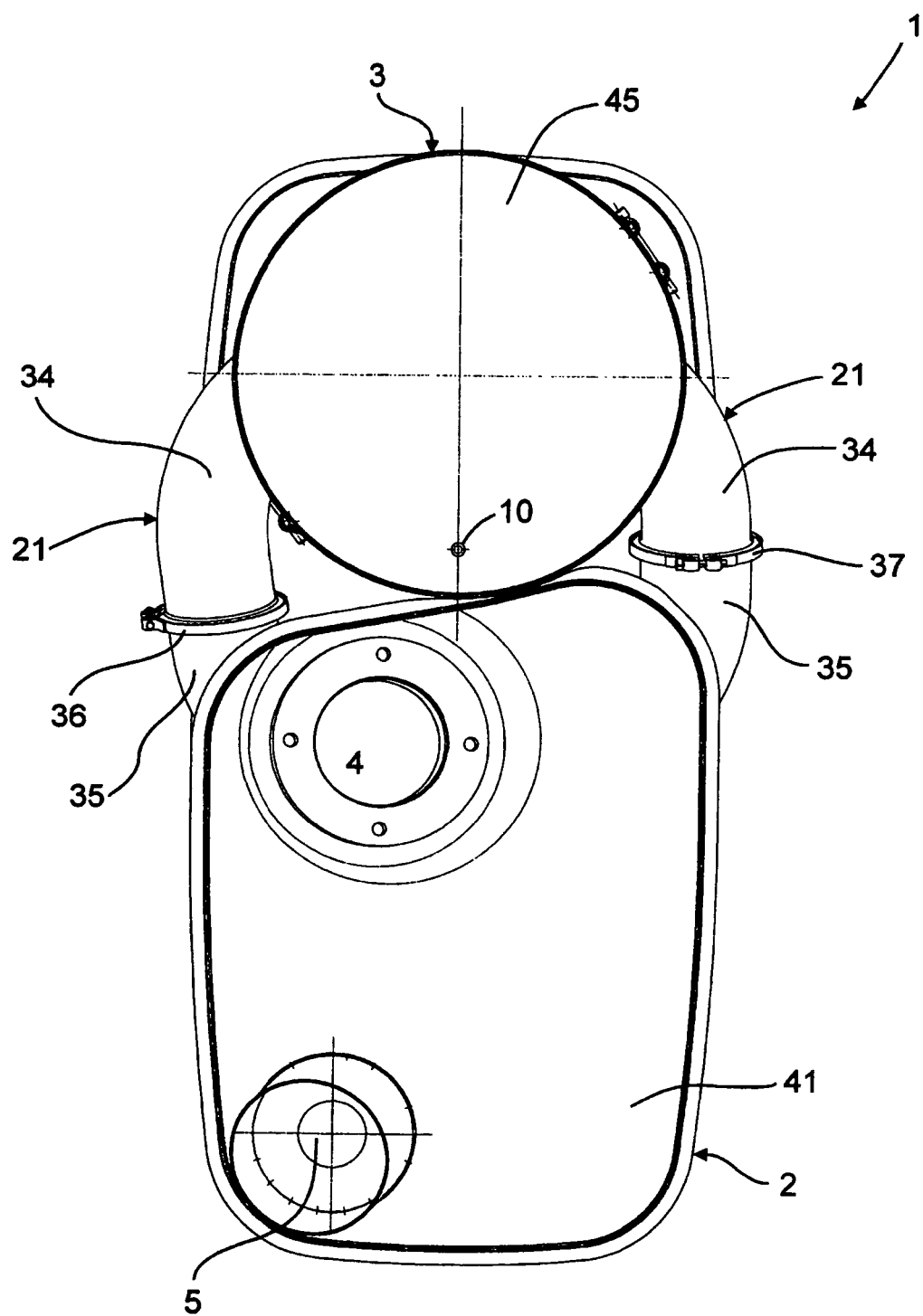
FIG. 2 is a front view of the exhaust gas treatment system according to arrow II in FIG. 1.
Figure 3:
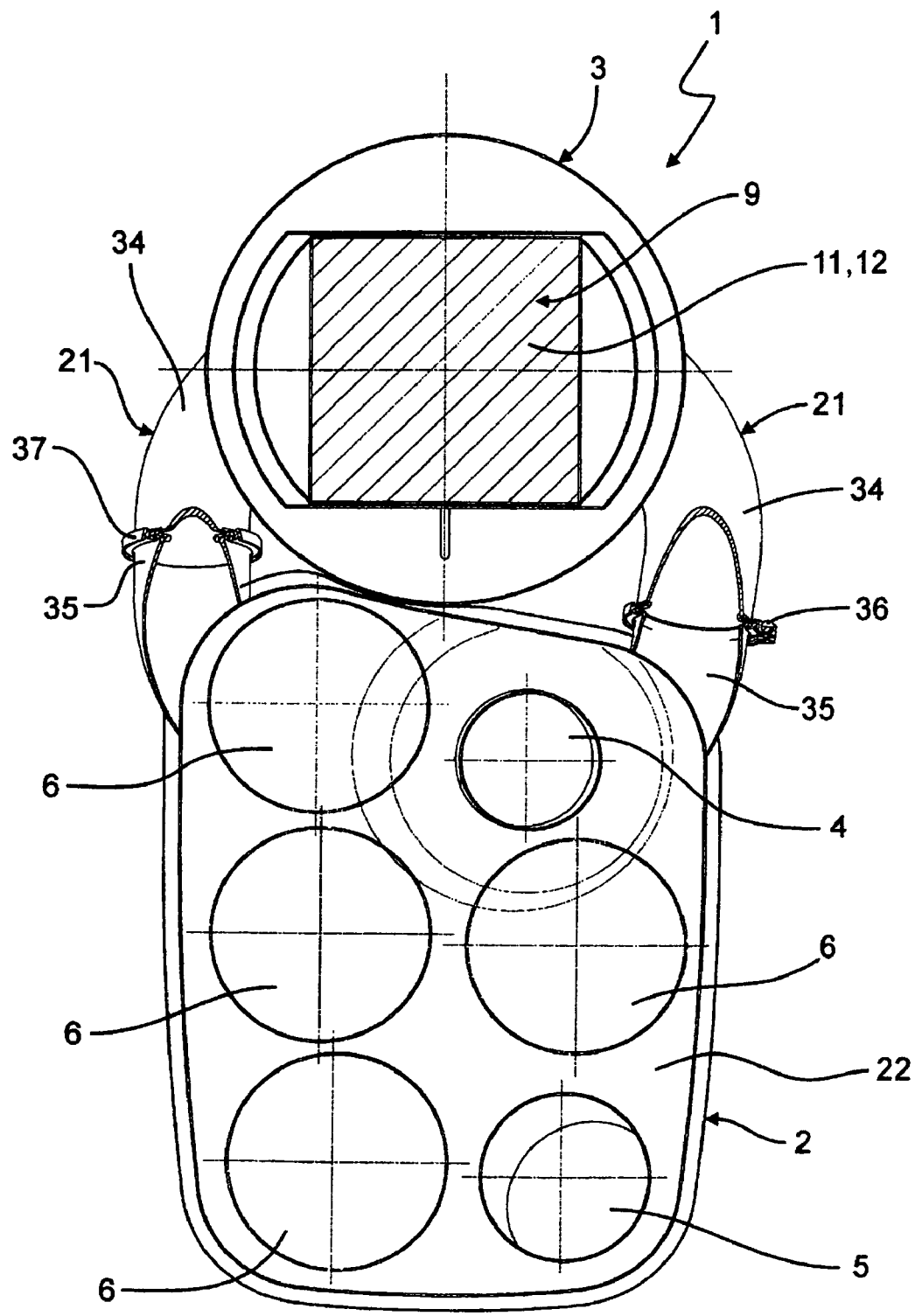
FIG. 3 is a cross section through the exhaust gas treatment system according to FIG. 1 along sectional lines III in FIG. 1.

According to FIGS. 1 through 3, the exhaust gas treatment system 1 also has at least one connecting pipe 21 which connects the third chamber 15 to the fourth chamber 16. In the present case, two such connecting pipes 21 are provided, arranged opposite one another with respect to the third chamber 15 and the fourth chamber 16. It is noteworthy that the two connecting pipes 21 run outside of the housings 2 and 3, i.e., each connecting pipe 21 leads out of the add-on housing 3 and leads into the basic housing 2.

The basic housing 2 has a first intermediate bottom 22 and a second intermediate bottom 23. The intermediate bottoms 22, 23 serve to reinforce the basic housing 2 and to support and/or position the inlet pipe 4, the outlet pipe 5 and the SCR catalysts 6. The inlet pipe 4, the outlet pipe 5 and the SCR catalysts 6 pass through the sixth chamber 18 accordingly.

The first intermediate bottom 22 is preferably designed to be airtight and separates the fourth chamber 16 from the sixth chamber 18. The second intermediate bottom 23 is arranged between the fifth chamber 17 and the sixth chamber 18. According to FIG. 4, the second intermediate bottom 23 may be designed to be gas permeable and to this end may have several through-openings 24, for example. The fifth space 17 and the sixth room 18 communicate through these through-openings 24. The outlet pipe 5 here has a jacket section 25, indicated by a curly bracket, inside the sixth chamber 18; the jacket section is also designed to be permeable to gas. This accomplished here by means of perforations 26. The exhaust thus flows from the fifth chamber 17 into the sixth chamber 18 and through the perforations 26 into the outlet pipe 5.

Figure 4:
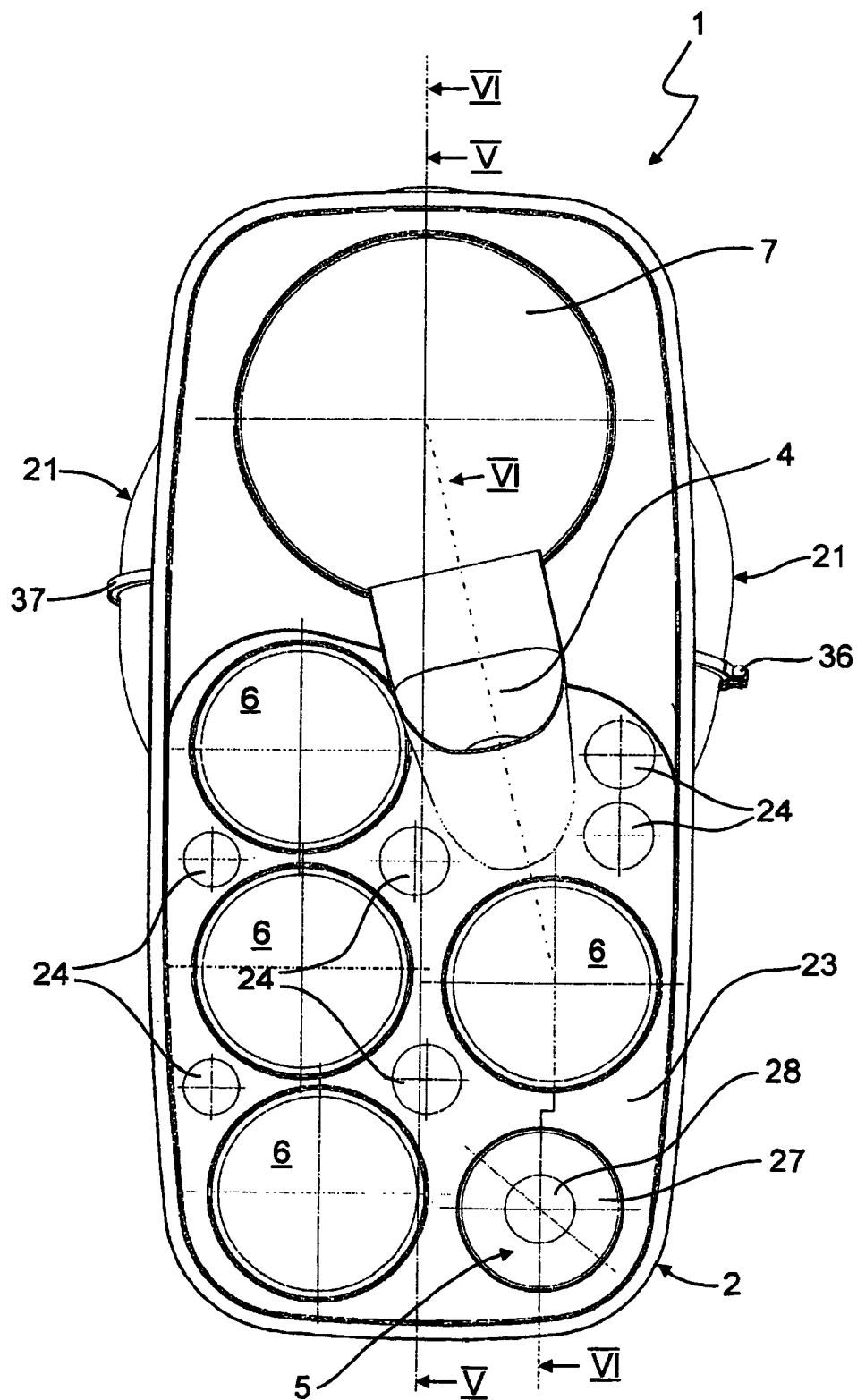
FIG. 4 is a cross section like that in FIG. 3 but according to sectional lines IV in FIG. 1.
Figure 5:
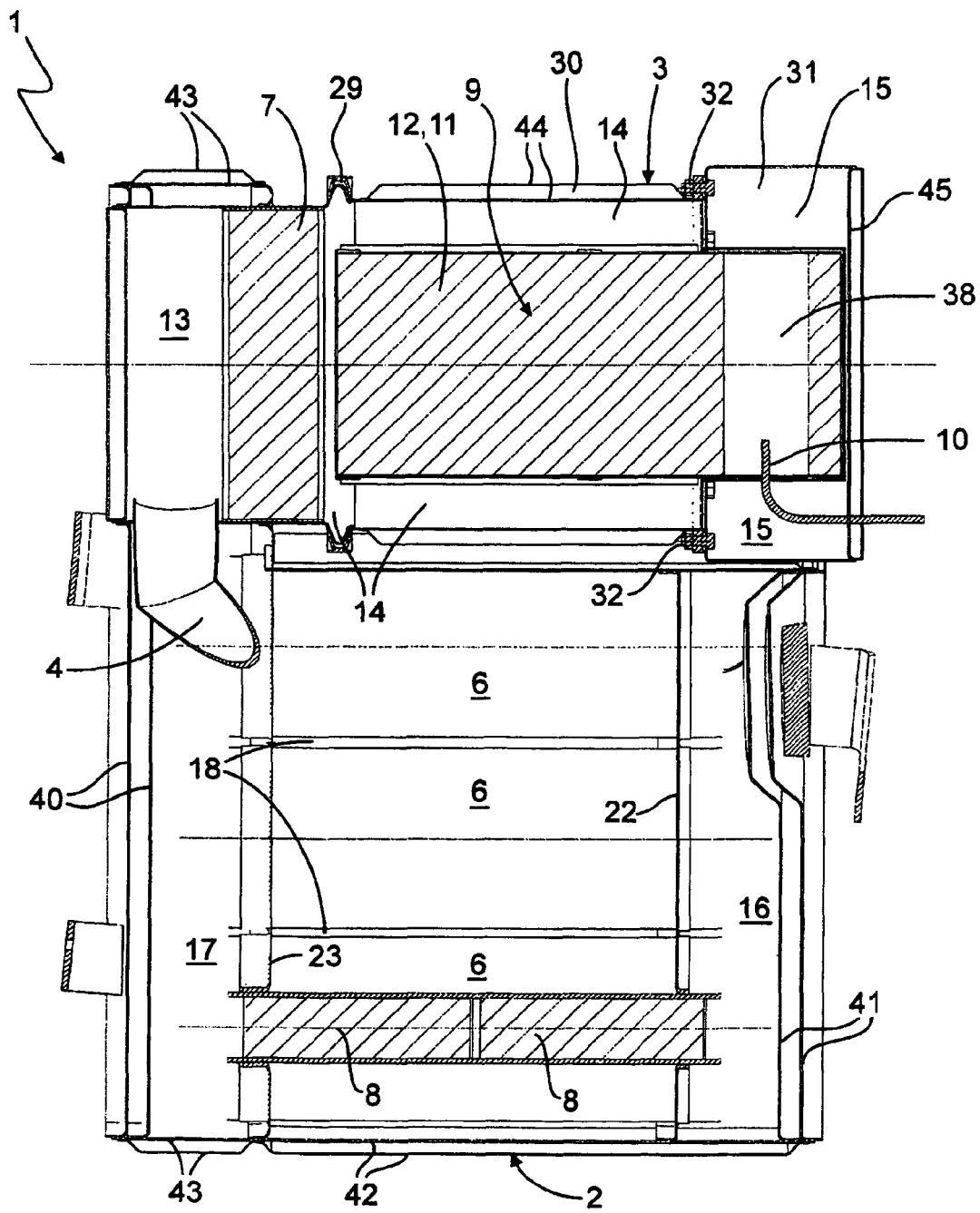
FIG. 5 is a longitudinal section through the exhaust gas treatment system according to sectional lines V in FIG. 4.
Figure 6:
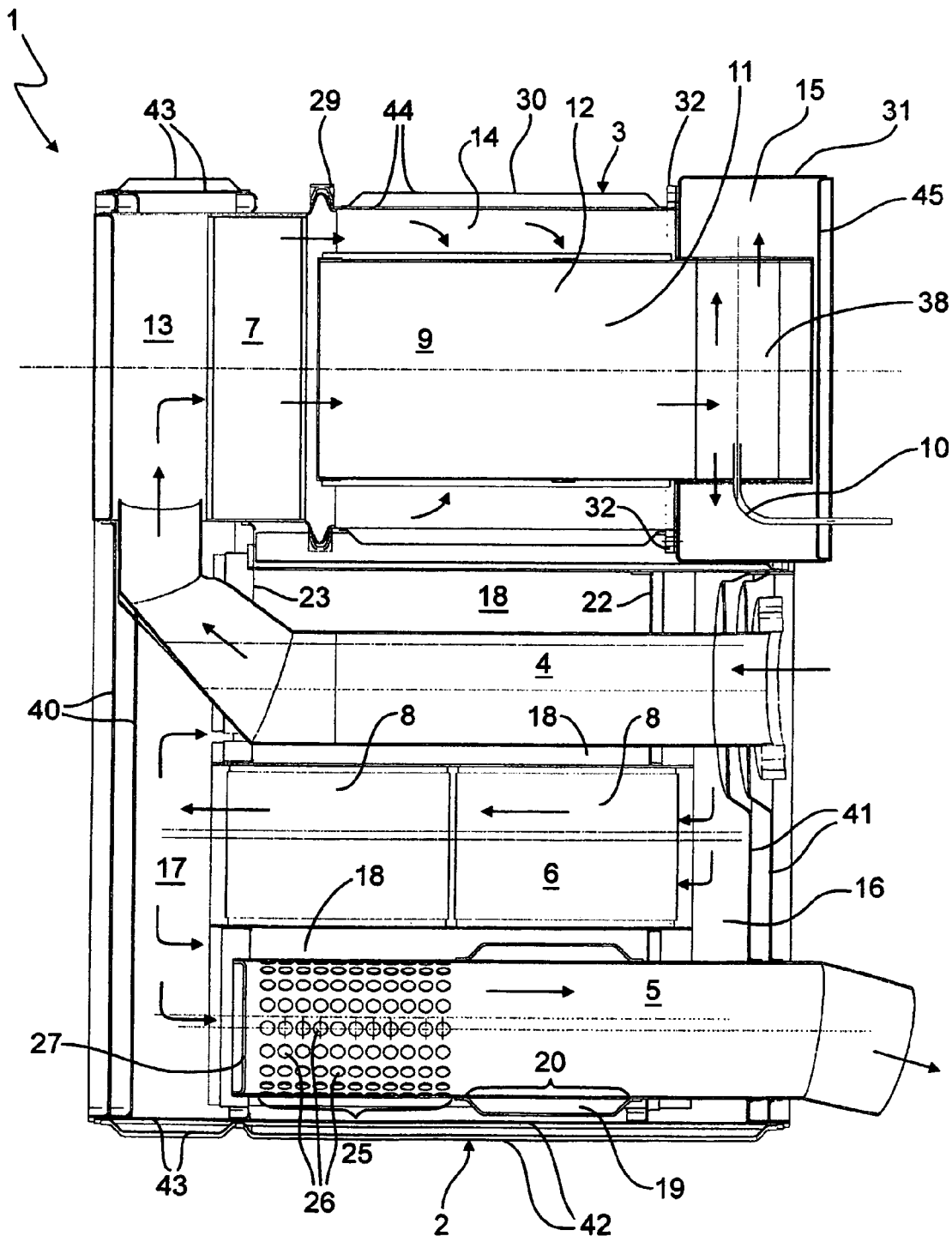
FIG. 6 is a longitudinal section like that in FIG. 5 but according to sectional lines VI in FIG. 4.

Additionally or alternatively, the outlet pipe 5, which protrudes into the fifth chamber 17, has a bottom 27 which is positioned in the fifth chamber 17 and may also be designed to be permeable for gas. The bottom 27 may be designed with an opening 28, as can be seen in FIG. 4. Accordingly the exhaust may also go from the fifth chamber 17 directly into the outlet pipe 5. Inside the exhaust gas treatment system 1, the flow path thus leads from the fifth chamber 17 directly into the outlet pipe 5 and/or leads into the outlet pipe 5 indirectly, namely through the sixth chamber 18.

According to this invention, the add-on housing 3 is attached to the basic housing 2 in such a way that it can be released nondestructively. Since the particle separation device 9 is situated in the add-on housing 3, it may be removed from the remaining exhaust gas treatment system 1 together with the add-on housing 3, so that the remaining exhaust gas treatment system 1 can remain on the exhaust system in the installed state. This greatly simplifies maintenance of the particle separation device 9. The add-on housing 3 is expediently attached to the basic 2 in the area of an outlet end of the oxidizing catalytic converter 7. The connection between the add-on housing 3 and the basic housing 2 is expediently established in this area with the help of a quick fastening element, formed here by a first hose clamp 29.

As the figures indicate, the inventive exhaust gas treatment system 1 is characterized by a particularly compact design. To this end, the inlet pipe 4, the outlet pipe 5, the SCR catalysts 6, the oxidizing catalytic converter 7 and the particle separation device 9 are each arranged so they are adjacent radially and parallel to one another. Furthermore, the oxidizing catalytic converter 7 and the particle separation device 9 are arranged axially side-by-side and in particular coaxially with one another. When the add-on housing 3 is installed on the basic housing 2, the exhaust gas treatment system 1 has an essentially rectangular contour in the side view according to FIGS. 1, 5 and 6. When the add-on housing 3 is removed, the remaining basic housing 2 has a b-shaped contour in the aforementioned side views.

The add-on housing 3 preferably consists of at least two housing parts. In the present case, a first housing part 30 and a second housing part 31 are provided. The first housing part 30 contains the second chamber 14 and the particle separation device 9. In the case of the embodiments illustrated in FIGS. 5 and 6, the particle separation device 9 is at least largely arranged inside the first housing part 30. In addition, the particle separation device 9 in these embodiments also protrudes into the second housing part 31. In contrast with that, in another embodiment the particle separation device 9 may also be arranged completely inside the first housing part 30. This arrangement is advantageous in particular when the first housing part 30 can be removed from the basic housing 2 independently of the second housing part 31.

The second housing part 31 contains the third chamber 15 and the reducing agent feed device 10. In addition, in the embodiments shown in FIGS. 5 and 6 here, an outlet side of the particle separation device 9 is accommodated inside the second housing part 31.

Preferably the two housing parts 30 and 31 are attached to one another so that they can be released without destruction. In the embodiments shown in FIGS. 5 and 6, the two housing parts 30 and 31 are screwed together. Corresponding screw connections are labeled as 32 in the figures.

In contrast with that, in the embodiment according to FIG. 1, the connection between the two housing parts 30 and 31 may also be implemented by means of a quick fastening element, which is formed here by a second hose clamp 33, for example. In this variant, it is advantageous that both pipe clamps 29 and 33 can be dismantled especially easily from the outside. With the pipe clamps 29, 33 released, the first housing part 30 can be pulled away from the second housing part 31 and from the basic housing 2 across its longitudinal direction. If the particle separation device 9 is situated essentially completely in the first housing part 30, the cost of maintenance of the particle separation device 9 can thereby be reduced accordingly.

The connecting pipes 21 are designed on the second housing part 31. These connecting pipes 21 here are each composed of a first pipe connection 34 and a second pipe connection 35. The first pipe connection 34 communicates with the third chamber 15 and extends outside of the add-on housing 3. The first pipe connection 34 is thus designed on the second housing part 31 of the add-on housing 3. In contrast with that, the second pipe connection 35 communicates with the fourth chamber 16 and runs outside the basic housing 2. Thus the second pipe connection 35 is designed on the basic housing 2. The two pipe connections 34, 35 are detachably joined together. Fast-connecting elements formed by a third and fourth pipe clamp 36 and 37, respectively, as an example are expediently used here for the connection. In this way, the second housing part 31 is connected to the basic housing 2 by the pipe connections 34, 35. To remove the entire add-on housing 3, thus only the first clamp 29, the third clamp 36 and the fourth clamp 37 must be opened. Then the add-on housing 3 can be removed from the basic housing 2 across its longitudinal direction.

It is likewise possible to remove the second housing part 31 from the basic housing 2 independently of the first housing part 30. To do so, according to FIG. 1, one need only release the second clamp 33, the third clamp 36 and the fourth clamp 37.

It is especially advantageous here that the individual housing parts 30, 31 and in particular the complete add-on housing 3 itself can be removed from the basic housing 2 independently of one another if the exhaust gas treatment system 1 is already fixedly tied into the exhaust system.

The third chamber 15 serves as a mixing chamber and ensures an intense and thorough mixing of the exhaust gases leaving the particle separation device 9 with the reducing agent which is added to the exhaust through the reducing agent feed device 10. In the embodiments in FIGS. 5 and 6, the particle separation device 9 has on its outlet side an outlet channel 38 which passes through the particle separation device 9 across its longitudinal direction. According to FIGS. 5 and 6, this outlet channel 38 extends vertically. The two connecting pipes 21 are preferably each connected to the third chamber 15 with a 90° offset relative to the mouth ends of the outlet channel 38. According to FIGS. 2, 3 and 4, the connecting pipes 21 are horizontally opposite one another in the mixing chamber (third chamber 15). This makes is possible to promote an intense and thorough mixing. In addition, static mixing devices (not shown here) may be arranged inside the outlet channel 38 and/or in the third chamber 15 to improve the mixing of the exhaust with the reducing agent.

In this connection, the special embodiment which is also shown here is especially important; in this embodiment, the reducing agent feed device 10 is arranged in such a way that it can spray the reducing agent directly into said outlet channel 38. In other words, the reducing agent is introduced into the exhaust directly at the outlet of the particle separation device 9 as closely as possible. This makes available a maximum flow path and thus also a maximum mixing time before the mixture enters the SCR catalysts 6.

Figure 7:
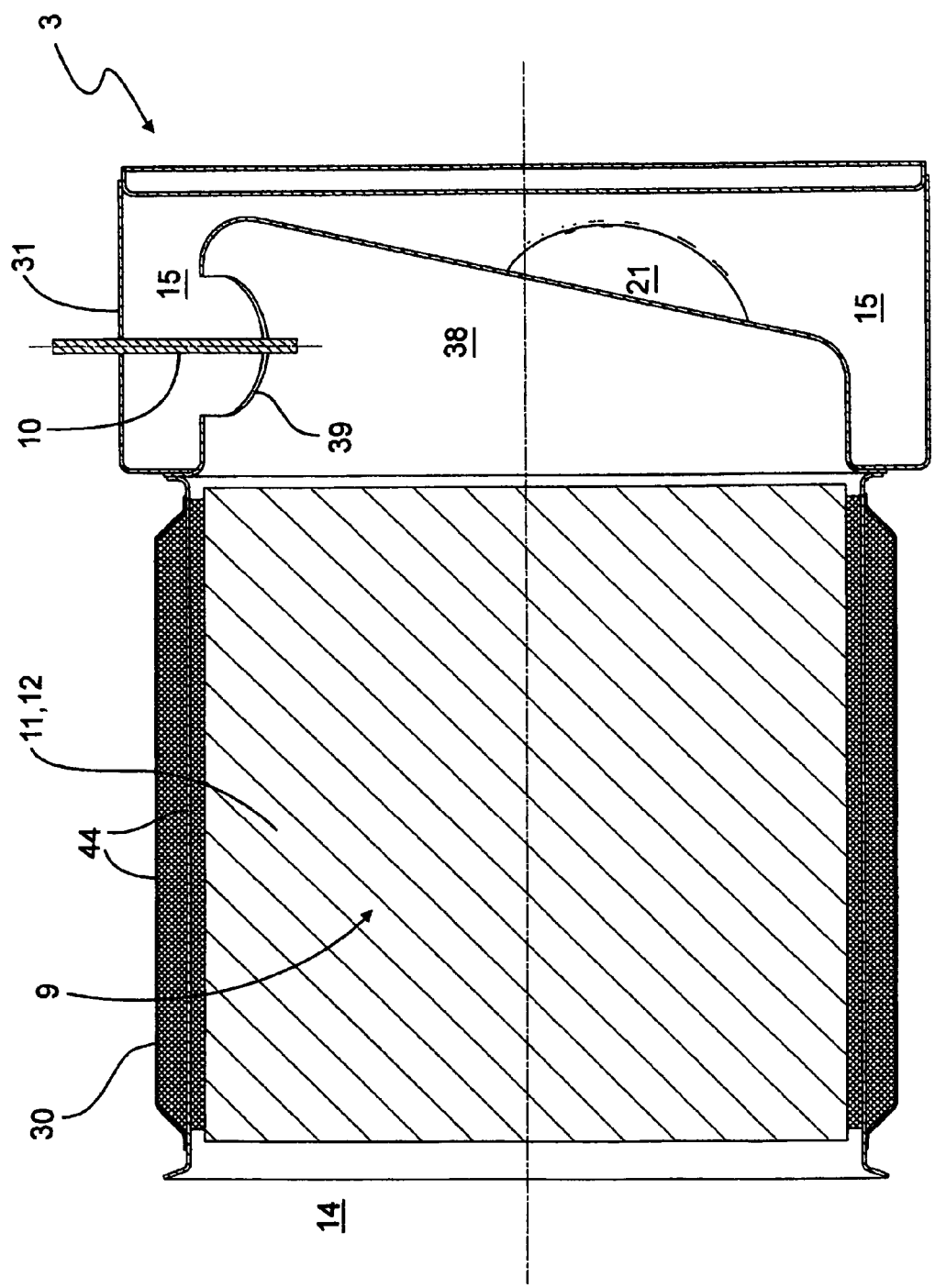
FIG. 7 is a longitudinal section through an add-on housing of the exhaust gas treatment system but in a different embodiment.

In another embodiment according to FIG. 7, the outlet channel 38 may be formed by a component of the second housing part 31 which collects the exhaust emitted from the particle separation device 9 and passes it through a single opening 39 into the third chamber 15. Here again, the reducing agent is sprayed inside the outlet channel 38.

The outlet pipe 5 is designed to be at least permeable to sound, in particular also permeable to gas in the longitudinal section 20 which is sheathed by the absorption chamber 19. In this way with the help of the absorption chamber 19 a high-frequency sound attenuation can be achieved.

To thermally insulate the exhaust gas treatment system 1 toward the outside, the main bottoms 40 and 41 which form the axial end faces of the basic housing 2 may be designed as double walls or double bottoms. Likewise, a jacket or jacket section 42 or 43 of the basic housing 2 may also be designed with double walls. In addition, the add-on housing 3 may have a double jacket 44 and a double bottom 45. Furthermore, the double jackets 42, 43, 44 and the double bottoms 40, 41, 45 may be filled with a suitable insulation material.

The inventive exhaust gas treatment system 1 combines complex exhaust purification measures using oxidizing catalytic converter 7, particle separation device 9, reducing agent feed mechanism 10 and SCR catalysts 6. In addition, the exhaust gas treatment system 1 also contains complex sound suppression functions using a plurality of chambers, sudden changes in cross section and the absorption chamber 19. Nevertheless, the exhaust gas treatment system 1 is extremely compact and can be completely preassembled, which facilitates installation in an exhaust system. It is also important that the add-on housing 3 can be removed easily and without destruction because this greatly simplifies maintenance of the components accommodated therein such as the particle separation device 9.

Another important advantage of the exhaust gas treatment system 1 presented here is that it can be modified comparatively easily. For example, when a variant without a particle separation device 9 is to be provided, instead of the add-on housing 3 shown here, another add-on housing having the same interfaces but designed for an improved noise suppression, for example, may be installed.

Maintenance of the particle separation device 9 is greatly simplified. First, a particle separation device 9 which extends essentially completely inside the first housing part 30 may be removed already by removing the first housing part 30. Removal of the particle separation device 9 shown in FIGS. 5 and 6 can also be accomplished by removing only the second housing part 31. The axial end of the particle separation device 9 is then accessible so that it can be removed axially from the first housing part 30.

What is claimed is:

1. An exhaust gas treatment system for an exhaust system of an internal combustion engine, comprising:

a basic housing and an add-on housing adapted to be mounted on the former so that the add-on housing is at least partially detachable from the basic housing;

the basic housing containing
- at least one inlet pipe adapted to be connected to the exhaust system and inserted into the basic housing,
- at least one outlet pipe adapted to be connected to the exhaust system and leading out of the basic housing,
- at least one SCR catalyst and at least one oxidizing catalytic converter;

wherein the add-on housing contains at least one particle separation device and at least one reducing agent feed mechanism, wherein the add-on housing has a first housing part accommodating essentially the second chamber and the particle separation device and a second part that is detachably mounted on the first housing part and accommodates the third chamber and the reducing agent feed mechanism, and wherein:
- the first housing part is adapted to be removed from the basic housing independently of the second housing part and;
- the second housing part is adapted to be removed from the basic housing independently of the first housing part.

2. An exhaust gas treatment system for an exhaust system of an internal combustion engine, comprising:

a basic housing and an add-on housing adapted to be mounted on the former so that the add-on housing is at least partially detachable from the basic housing;

wherein the basic housing contains:
- at least one inlet pipe adapted to be connected to the exhaust system and inserted into the basic housing,
- at least one outlet pipe adapted to be connected to the exhaust system and leading out of the basic housing,
- at least one SCR catalyst and at least one oxidizing catalytic converter;

wherein the add-on housing contains at least one particle separation device and at least one reducing agent feed mechanism, wherein multiple SCR catalysts are provided and are arranged so that flow passes through them in parallel, and wherein the multiple SCR catalysts together have a larger flow cross-section than the flow cross-section of the particle separation device.

3. An exhaust gas treatment system for an exhaust system of an internal combustion engine, comprising:

a basic housing and an add-on housing adapted to be mounted on the former so that the add-on housing is at least partially detachable from the basic housing;

wherein the basic housing contains
- at least one inlet pipe adapted to be connected to the exhaust system and inserted, into the basic housing,
- at least one outlet pipe adapted to be connected to the exhaust system and leading out of the basic housing, and
- at least one SCR catalyst and at least one oxidizing catalytic converter;

wherein the add-on housing contains at least one particle separation device and at least one reducing agent feed mechanism, wherein a flow path is formed in the exhaust gas treatment system passing through the inlet pipe into a first chamber, through the oxidizing catalytic converter into a second chamber through the particle separation device into a third chamber where the reducing agent is introduced, through at least one connecting pipe into a fourth chamber, through the SCR catalyst into a fifth chamber and through the outlet pipe, and wherein the add-on housing has a first housing part accommodating essentially the second chamber and the particle separation device and a second part that is detachably mounted on the first housing part and accommodates the third chamber and the reducing agent feed mechanism.

4. The exhaust gas treatment system according to claim 3, wherein:
- the first housing part is adapted to be removed from the basic housing independently of the second housing part and;
- the second housing part is adapted to be removed from the basic housing independently of the first housing part.

5. The exhaust gas treatment system according to claim 3, wherein at least one of the add-on housing, the first housing part and the second housing part is adapted to be removed from the basic housing when the exhaust gas treatment system is connected to the exhaust system.

6. The exhaust gas treatment system according to claim 3, wherein the add-on housing is added onto the basic housing in the area of an outlet side of the oxidizing catalytic converter.

7. The exhaust gas treatment system according to claim 3, wherein the oxidizing catalytic converter and the particle separation device are arranged in at least one of axial proximity and coaxially next to one another.

8. The exhaust gas treatment system according to claim 3, wherein the inlet pipe, the outlet pipe, the at least one SCR catalyst, the oxidizing catalytic converter and the particle separation device are arranged in radial proximity to one another and in parallel to one another.

9. The exhaust gas treatment system according to claim 3, wherein multiple SCR catalysts are provided and are arranged so that flow passes through them in parallel.

10. The exhaust gas treatment system according to claim 3, wherein each SCR catalyst has at least two SCR catalyst elements through which the flow passes in series.

11. The exhaust gas treatment system according to claim 3, wherein the outlet pipe has a sound-permeable longitudinal section sheathed by an absorption chamber.

12. The exhaust gas treatment system according to claim 11, wherein the absorption chamber is arranged inside the sixth chamber.

13. An exhaust gas treatment system for an exhaust system of an internal combustion engine, comprising:

a basic housing and an add-on housing adapted to be mounted on the former so that the add-on housing is at least partially detachable from the basic housing;

the basic housing containing
- at least one inlet pipe adapted to be connected to the exhaust system and inserted into the basic housing,
- at least one outlet pipe adapted to be connected to the exhaust system and leading out of the basic housing,
- at least one SCR catalyst and at least one oxidizing catalytic converter;

wherein the add-on housing contains at least one particle separation device and at least one reducing agent feed mechanism, wherein a flow path is formed in the exhaust gas treatment system passing through the inlet pipe into a first chamber, through the oxidizing catalytic converter into a second chamber through the particle separation device into a third chamber where the reducing agent is introduced, through at least one connecting pipe into a fourth chamber, through the SCR catalyst into a fifth chamber and through the outlet pipe, and wherein the respective connecting pipe has a first pipe connection that communicates with the third chamber and runs outside of the add-on housing and a second pipe connection which is detachably connected to the first pipe connection, communicates with the fourth chamber and runs outside of the basic housing.

14. The exhaust gas treatment system according to claim 13, wherein
the add-on housing is attached to the basic housing using at least one quick fastening element, or
the second housing part is attached to the first housing part with at least one quick fastening element, or
the second pipe connection is attached to the first pipe connection using at least one quick fastening element.

15. The exhaust gas treatment system according to claim 14, wherein the quick fastening elements comprise clamps.

16. An exhaust gas treatment system for an exhaust system of an internal combustion engine, comprising:
a basic housing and an add-on housing adapted to be mounted on the former so that the add-on housing is at least partially detachable from the basic housing;
the basic housing containing
at least one inlet pipe adapted to be connected to the exhaust system and inserted into the basic housing,
at least one outlet pipe adapted to be connected to the exhaust system and leading out of the basic housing,
at least one SCR catalyst and at least one oxidizing catalytic converter;
wherein the add-on housing contains at least one particle separation device and at least one reducing agent feed mechanism, and
wherein
a first intermediate bottom separates the fourth chamber from a sixth chamber;
a second intermediate bottom separates the fifth chamber from the sixth chamber;
the at least one SCR catalyst, the inlet pipe and the outlet pipe pass through the sixth chamber.

17. The exhaust gas treatment system according to claim 16, wherein the second intermediate bottom has at least one through-opening or a perforation through which the fifth chamber communicates with the sixth chamber.

18. The exhaust gas treatment system according to claim 16, wherein the outlet pipe has at least one of
a gas-permeable jacket section inside the sixth chamber, wherein the outlet pipe communicates through it with the sixth chamber, and
a gas-permeable bottom inside the fifth chamber, wherein the outlet pipe communicates through it with the fifth chamber.

* * * * *